Oct. 20, 1936.  K. RÄNTSCH  2,057,977
DEVICE FOR COPYING BY PROJECTION IMAGES ON LENTICULATED FILMS
Filed June 21, 1934
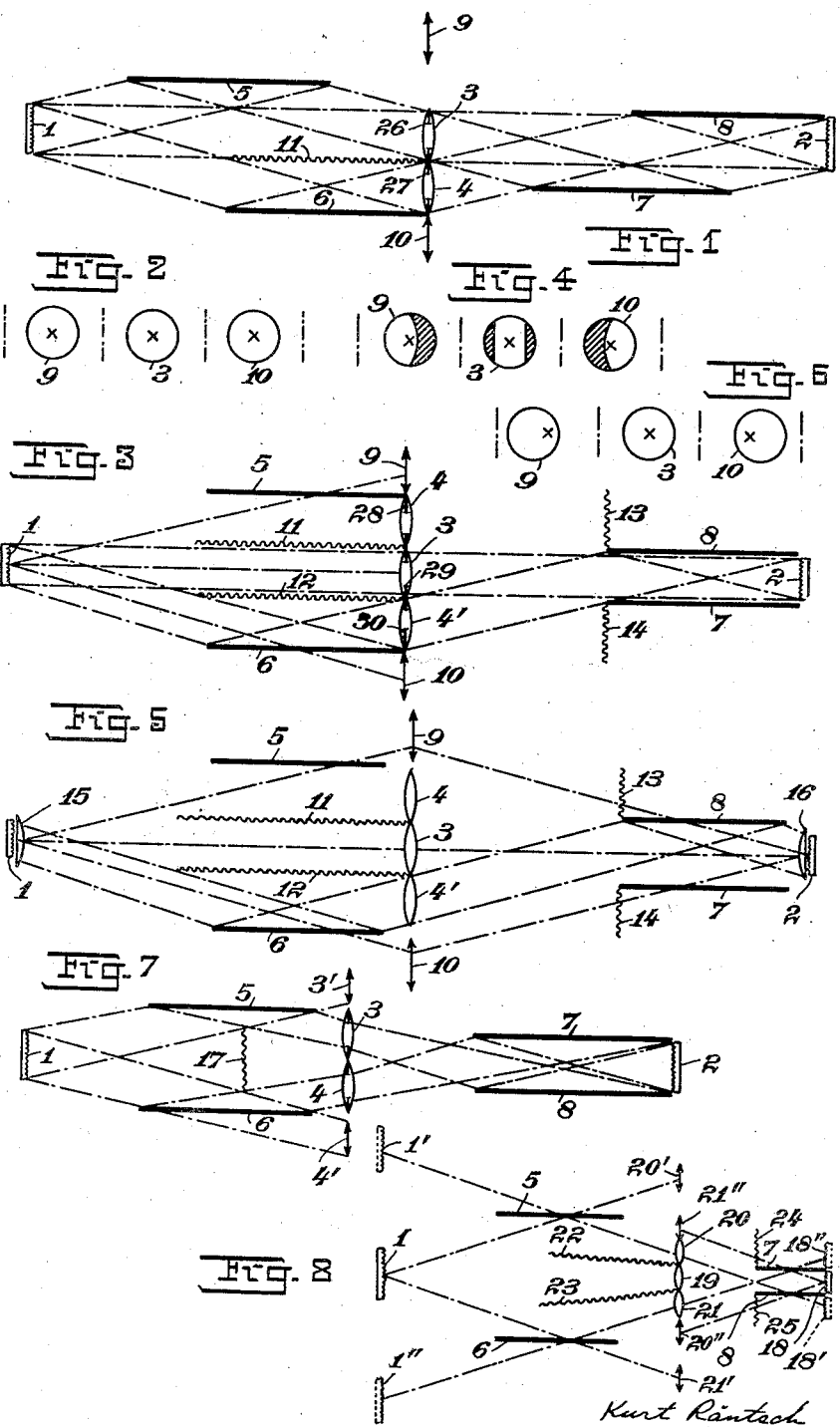
Kurt Räntsch
INVENTOR
By: Gifford, Scull & Burgess
ATTORNEYS.

UNITED STATES PATENT OFFICE 2,057,977

DEVICE FOR COPYING BY PROJECTION IMAGES ON LENTICULATED FILMS

Kurt Räntsch, Teltow-Seehof, near Berlin, Germany, assignor to Opticolor Aktiengesellschaft, Glarus, Switzerland, a corporation of Switzerland Application June 21, 1934, Serial No. 731,587
In Germany July 6, 1933

7 Claims. (Cl. 88—24)

My invention relates to new and useful devices for copying images on lenticulated films, which films are well known in the art and serve for the taking and projecting of images in natural colors.

In my copending application 688,545 relating to "Printing apparatus for lenticulated films", I have described several optical systems for projection purposes. These systems are composed by an objective or concave mirror and optical means, especially plane reflecting surfaces, which are arranged in such a manner, that the opening of the objective or mirror is seen in different directions from the films. Besides, from the objective, the films are seen in exactly opposite directions. Thus I am enabled to make use of objectives with a rather small relative aperture, though it is known, that the angular opening of copying lenses must be about equal to that of the lenticular elements. The reason is that the light beams passing in the directions of the images of the objective-opening, seen in the said plane mirrors, serve for copying those parts of the images which correspond to the lateral zones of the multicolor filter used in taking or projecting.

This invention is based on the same principle, the chief difference being that more than one objective is used. Each objective is arranged in such a manner that it forms an image of the original film on the same printing film. For this purpose at least one of the objectives is combined with plane reflecting surfaces or other optical means of similar action. These have the effect that, from the opening of the corresponding objective, both films are seen in exactly opposite directions.

The chief advantages of such optical system are:

The images on the copied film are of a remarkable sharpness and of high definition, which could not be had with the formerly used objectives of high relative opening.

No moires or watering effects may be observed.

Scattered light and such light beams which are severally reflected may easily be completely suppressed. These light beams sometimes caused disturbing color degradations.

The copying of those parts corresponding to different zones of the multicolor filter may be affected, for instance by the use of diaphragms, wholly independently from each other. Thus I may correct wrong exposure by copying some parts with more and other parts with less intensive light. Besides, individual diaphragming of the different zones is possible for suppressing light diffusion from one zone into the other.

Some examples of my invention are represented in the accompanying drawing, in which equal references represent equal parts.

Figures 1, 3, 5, 7 and 8 show the plan views of some devices according to the invention.

Figures 2, 4 and 6 represent the openings and images of the openings of the objectives, which are seen from the films in the devices shown respectively in the Figures 1, 3 and 5.

Referring first to Figure 1, I assume the original film 1 to be reproduced on the duplicate film 2 by the help of the lenses 3 and 4. Both films are so arranged that they are perpendicular to the optical axis of the lens 3 and that this axis passes, at least approximately, by the center of the films. The angular opening of the objective 3 is only sufficient for taking up all these light beams which start from the film 1 in a direction in which the central filter zone was seen when the film was exposed in the camera. Thus this objective would only serve for reproducing on the film 2 the part of the image corresponding to said central zone.

But the light beams starting from the original film in a direction which corresponds to one lateral zone of the taking filter are reflected by the mirror 5 so that they pass by the objective and are then reflected by the mirror 7 as to meet the film 2. The image produced by these beams is in exact registration with that produced by the unreflected beams. The aperture of the lens 3 is seen from the film 1 at 9 and from the film 2 at 10, where one lateral zone is seen in the taking or projecting process.

The mirror 6 reflects the light beams starting from the film in the direction of the other lateral zone so that they pass the lens 4 and are then reflected by the mirror 8 as to meet the film 2. This image, too, is in exact registration with the other two. The image of the aperture of lens 4 is seen from the film 1 at 10 and from the film 2 at 9. A diaphragm 11 is arranged between the lenses 3 and 4 about parallel to the optical axes so that it cuts off all beams which may be reflected from the mirror 6 and would else pass by the lens 3.

The objective and its images, as seen from one film, are represented in Figure 2. The dash-dotted lines of this figure mark the edges between the zones of the multicolor filter which was employed when the view was taken. It is seen that the apertures 3, 9 and 10 are lying symmetrically to the centers of the corresponding zones, which are marked by the small crosses. By increasing or decreasing the distances of the mirrors from the optical axes of their corresponding lenses I may get any desired asymmetrical position.

Further, by diaphragming the lens 4 it is possible to affect the light beams passing by this objective without affecting those passing by 3. Such diaphragms are 26 and 27. They are well known in the art.

In Figure 3 the original film 1 is imaged on the copying film 2 by the help of three objectives 3, 4, 4'. The objective 3 is effective without any reflecting surface, the lens 4 being combined with the two mirrors 5 and 7, and the lens 4' being combined with the two mirrors 6 and 8. The path of the light beams may be seen from the figure. It is similar to that of Figure 1. The diaphragms 11 to 14 cut off all scattered light.

The apertures of the objectives 3, 4 and 4' which are represented in Figure 4 are seen at 9, 3 and 10. They may be diaphragmed independently from each other. Such diaphragming as is effected by the diaphragms 28, 29 and 30, is represented in Figure 4 by the hatched areas. It may be performed in symmetrical or in asymmetrical manner, as is afforded by the process. Besides, the intensity of the three light beams may be controlled independently from each other.

The arrangement of Figure 5 is slightly modified as compared with that of Figure 3, one difference being that the distances of the plane reflecting surfaces are somewhat greater than in the before described Figure 3. Thus the apertures 9, 3 and 10 are lying asymmetrical with respect to the centers of the corresponding filter zones. In Figure 6 the images 9 and 10 are a little more distant from the aperture 3 than are the small crosses representing the centers of the corresponding filter zones. The distances between 9 and 3 and between 10 and 3 may be different or equal, according to the distances of the mirrors from the axes of the objectives.

The lenses 15 and 16 placed in front of the two films and near to them serve for making the apertures to be seen from the films in distances equal to those in which the filters are seen from the films in taking or projecting.

The number of objectives may also be superior to three, for instance by arranging two further objectives over and beneath the objective 3, each being combined with a pair of mirrors in the same manner as the objectives 4 and 4'. Such arrangement may be useful for copying films with spherically formed lenticular elements.

Another device which is of special interest when films are reproduced only carrying two different images as is the case, for instance, with some stereo-processes, is represented in Figure 7. The two objectives 3 and 4 are arranged between the films 1 and 2 symmetrically to the connection line of the centers of the film gates. The plane mirrors 5 and 8 belong to the lens 3 and the plane mirrors 6 and 7 to the lens 4 so that the lens apertures are seen from the films at 3' and 4' respectively. The diaphragm 17 cuts off all light beams which would pass by the lenses directly so that only reflected beams are allowed to pass by them.

The device of Figure 8 is such that duplicates at reduced or enlarged scale are had. The principle of this device is the same as that of Figure 3. The wider film 1 may be that which is to be reproduced. But, of course, the direction of the light beams may be contrary to that the original film is the smaller one. The lenses 19, 20, 21 are juxtaposed between the films. The lens 19 forms a sharp image of the film 1 at reduced scale at the film 18. Its angular aperture is so chosen that only light corresponding to the central filter zone reaches the objective. The analogue is valid for the lenses 20 and 21. Images of the apertures of the objectives 20 and 21 are seen from the film 1 in the mirrors 5 and 6 at 20' and 21'. On the other side, the mirrors 7 and 8 are adjusted so that, in these mirrors, the apertures of the objectives 20 and 21 are seen from the film 18 at 20'' and 21''. The exact position of the mirrors is defined by the condition that, from each lens, the films or their images formed by said mirrors are to be seen in exactly opposite directions. For instance, from the lens 20 the film 1 is seen at 1' and the film 18 at 18'. The diaphragms 22 to 25 serve for cutting off disturbing scattered light.

What I claim is:

1. In combination, an original film having thereon a multiplicity of lenticulations of substantially equal aperture and a group of color records behind each of said lenticulations, a copy film having similar lenticulations thereon, an optical system adapted to pass light from the original film to the copy film and including lenses disposed side by side transversely of the lenticulations in the path of light passing between said films, each lens being of smaller aperture than that of a lenticulation, and optical means for directing selected components of the light from the records on the original film respectively through selected ones of said lenses to the copy film.

2. In combination, an original film having thereon a multiplicity of lenticulations of substantially equal aperture and a group of color records behind each of said lenticulations, a copy film having similar lenticulations thereon, an optical system adapted to pass light from the original film to the copy film and including lenses disposed side by side transversely of the lenticulations in the path of light passing between said films, each lens being of smaller aperture than that of a lenticulation, and optical means for directing selected components of the light from the original film respectively through selected ones of said lenses to the copy film, said optical means causing the same number of views of lenses to be seen at one of the films as there are color records in one of said groups.

3. In combination, an original film having thereon a multiplicity of lenticulations of substantially equal aperture and a group of color records behind each of said lenticulations, a copy film having similar lenticulations thereon, an optical system adapted to pass light from the original film to the copy film, a plurality of lenses each of smaller aperture than that of a lenticulation and disposed side by side transversely of the lenticulations in the path of light passing from the original film to the copy film, and optical means between each film and said lenses causing views of each of said lenses to be seen from the entire surface of each film.

4. In combination, an original film having thereon a multiplicity of lenticulations of substantially equal aperture and a group of color records behind each of said lenticulations formed by exposure of the film through a color filter having as many zones as there are records in said group, a copy film having similar lenticulations thereon, an optical system adapted to pass light from the original film to the copy film, a plurality of lenses each of smaller aperture than that of a lenticulation and disposed side by side transversely of the lenticulations in the path of light passing from the original film to the copy film, and optical means between each film and said lenses causing views of each of said lenses to be seen from the entire surface of each film and as many views being seen as there are zones in the filter.

5. In combination, an original film having thereon a multiplicity of lenticulations of substantially equal aperture and a group of color records behind each of said lenticulations, a copy film having similar lenticulations thereon, an optical system adapted to pass light from the original film to the copy film and including lenses disposed side by side transversely of the lenticulations in the path of light passing between said films, each lens being of smaller aperture than that of a lenticulation, optical means for directing selected components of the light from the records on the original film respectively through selected ones of said lenses to the copy film, and diaphragms extending between the paths taken by said components, to help define said paths.

6. In combination, an original film having thereon a multiplicity of lenticulations of substantially equal aperture and a group of color records behind each of said lenticulations, a copy film having similar lenticulations thereon, an optical system adapted to pass light from the original film to the copy film and including a plurality of lenses each of smaller aperture than that of a lenticulation and disposed side by side transversely of the lenticulations in the path of light passing from the original film to the copy film, and mirrors arranged to deflect light passing from one of said records through one of said lenses to said copy film.

7. In combination, an original film having thereon a multiplicity of lenticulations of substantially equal aperture and a group of color records behind each of said lenticulations, a copy film having similar lenticulations thereon, an optical system adapted to pass light from the original film to the copy film and including a plurality of lenses each of smaller aperture than that of a lenticulation and disposed side by side transversely of the lenticulations in the path of light passing from the original film to the copy film, mirrors arranged to deflect light passing from one of said records through one of said lenses to said copy film, and diaphragms extending between the paths of light from the lenses to one of the films, to help define said paths.

KURT RÄNTSCH.